Dec. 4, 1962 J. W. H. JUSTICE ET AL 3,067,360

PHOTO-MULTIPLIER CIRCUITS

Filed Oct. 15, 1959 5 Sheets-Sheet 1

INVENTOR
James W. H. Justice
Reginald Graham
BY
Ralph B. Stewart
ATTORNEY

INVENTOR
James W. H. Justice
Reginald Graham
BY
Ralph B. Stewart
ATTORNEY

Dec. 4, 1962 J. W. H. JUSTICE ET AL 3,067,360

PHOTO-MULTIPLIER CIRCUITS

Filed Oct. 15, 1959 5 Sheets-Sheet 3

INVENTOR
James W. H. Justice
BY Reginald Mesham
Ralph B. Stewart
ATTORNEY

Dec. 4, 1962 J. W. H. JUSTICE ET AL 3,067,360

PHOTO-MULTIPLIER CIRCUITS

Filed Oct. 15, 1959 5 Sheets-Sheet 4

INVENTORS
JAMES WILLIAM HENRY JUSTICE
AND REGINALD GRAHAM
BY Kemon, Palmer, Stewart & Estabrook
ATTORNEYS

PHOTO-MULTIPLIER CIRCUITS

Filed Oct. 15, 1959 5 Sheets-Sheet 5

INVENTORS
JAMES WILLIAM HENRY JUSTICE
AND REGINALD GRAHAM
By Kemon, Palmer, Stewart & Estabrook
ATTORNEYS United States Patent Office 3,067,360

Patented Dec. 4, 1962

3,067,360
PHOTO-MULTIPLIER CIRCUITS

James William Henry Justice and Reginald Graham, London, England, assignors to Sylvania-Thorn Colour Television Laboratories Limited, London, England, a British company Filed Oct. 15, 1959, Ser. No. 846,713
Claims priority, application Great Britain Oct. 17, 1958
5 Claims. (Cl. 315—10)

Figure 1:
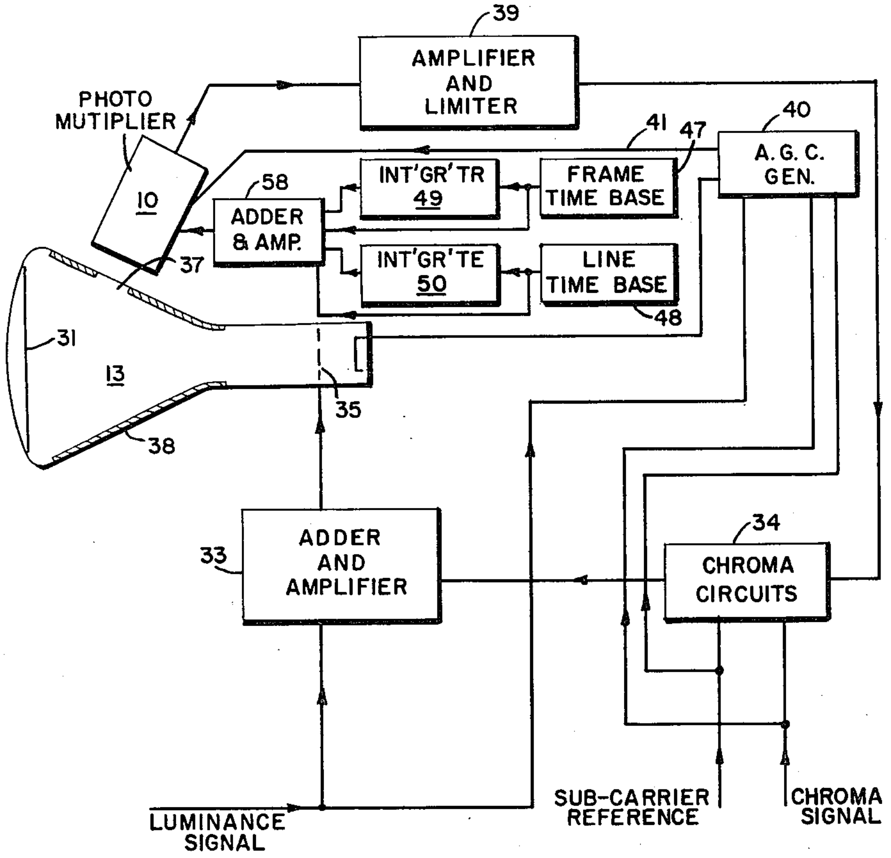

The present invention relates to photo-multiplier circuits.

In many television systems, particularly for colour television, the phase of an index signal derived in a photo-multiplier by scanning a screen gives the information required in order to enable the instantaneous position of a scanning beam to be maintained in desired relation to television signals to be reproduced, and often the amplitude of the index signal varies over a considerable range. This variation may arise from variation in the intensity of the scanning beam in accordance with the television signals and also from differences between the light pick-up from different parts of the screen. It is then necessary to reduce this variation in amplitude before the signal can be used.

One way in which the range of amplitude variation can be reduced is to pass the signal through a limiting amplifier. However this method has the following disadvantages:

(1) In many cases the output of the photo-multiplier is determined by the maximum permissible current in the anode and final dynode circuits. Because of this the gain of the photo-multiplier must be so adjusted that this current is not exceeded when the index signal is at its greatest. If this is done, the output of the photo-multiplier when the signal is at its smallest is very small and may need to be amplified before being applied to the limiting amplifier.

(2) Since the required information is contained in the phase of the index signal it is essential that the phase response of the limiting amplifier be independent of the input signal. In practice this can be difficult to achieve if the range of input signals is large.

According to the present invention, therefore, there is provided television receiving apparatus in which an index signal is generated in a photo-multiplier having its cathode disposed to receive light from a pattern of markings on a picture-reproducing screen during scanning of the screen by a scanning beam, the photo-multiplier being provided with automatic gain control such that variations in the amplitude of the index signal as a result of variations in intensity of the scanning beam or of light pick-up from different parts of the screen, are reduced. The index signal from the photo-multiplier may then be applied to an amplitude limiter in order to render the amplitude still more nearly constant.

The control signal required for the automatic gain control may be obtained by rectifying the output of the photo-multiplier, or by passing the output of the photo-multiplier through a low-pass filter having a cut-off frequency below the index frequency, or the lowest index frequency where their is more than one.

In most index systems in colour television the signal applied to control the beam current of a cathode ray picture reproducing tube consists of what is known as an "M" signal and a writing frequency signal which determines the colour produced. The way in which an "M" signal can be derived from a luminance signal and a chroma signal is described in the specification of patent application Serial No. 765,757, filed October 7, 1958, now U.S. Letters Patent 2,945,087, granted July 12, 1960. In some index systems, for instance that described in their earlier specification, the amplitude of the index signal produced is proportional to the mean beam current. In such cases, therefore, a control signal suitable for gain control can be derived from the "M" signal.

In order to compensate for differences in light pick-up from different parts of the screen, a control signal suitable for gain control may be derived from the line and frame time-base circuits.

In order to control the gain of the photo-multiplier, the control signal may be applied to vary the potential difference between two adjacent dynodes.

Figure 2:
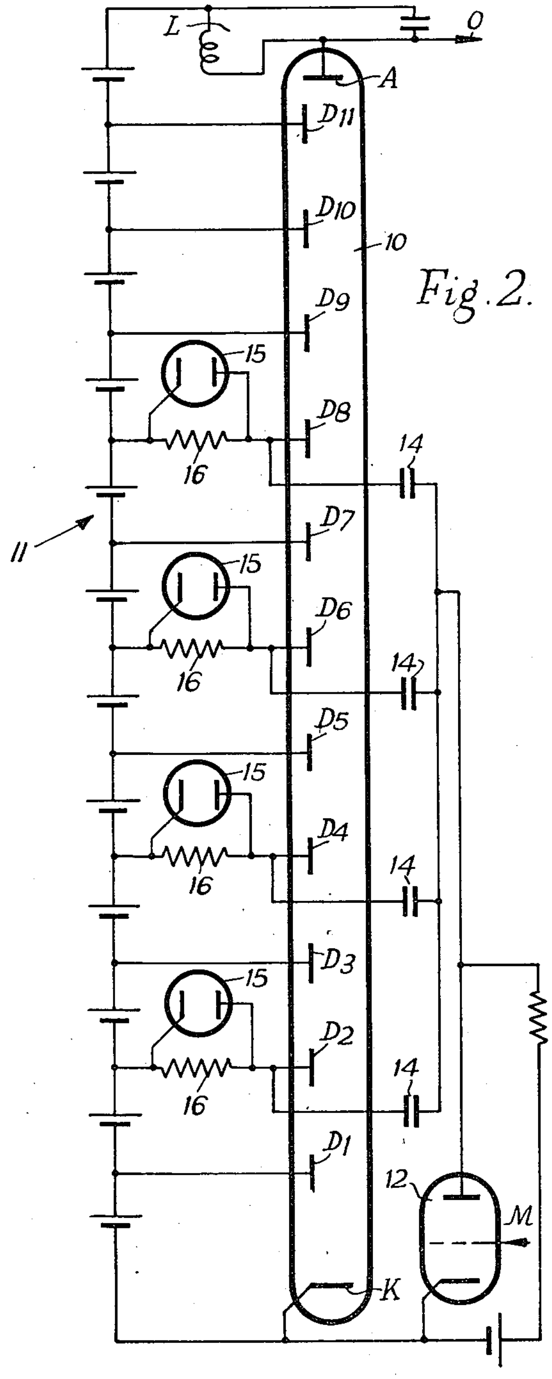
Figure 3:
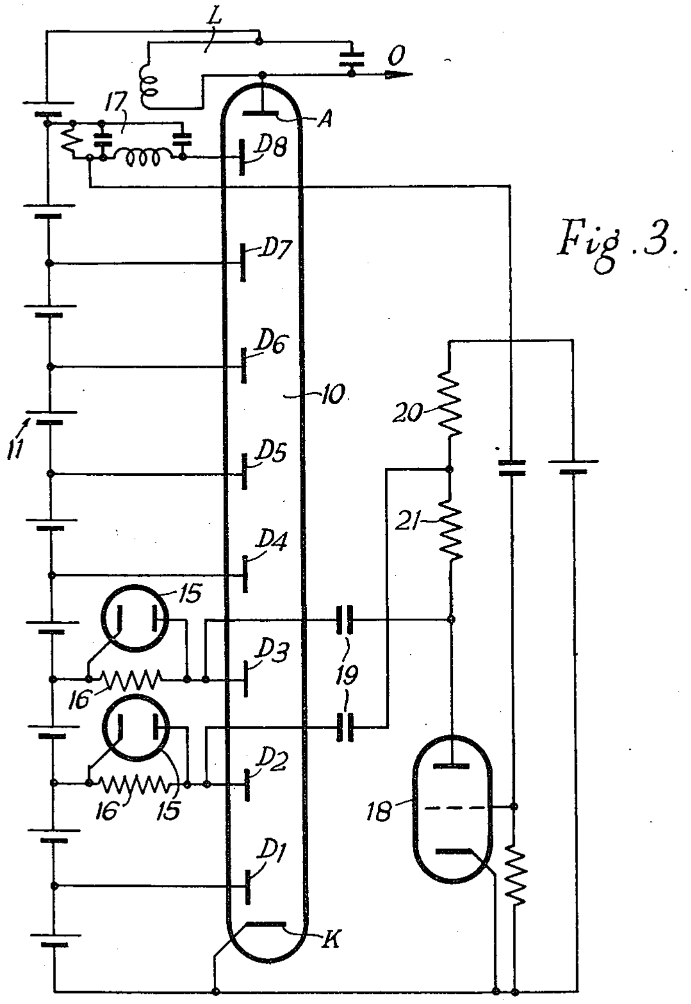
Figure 4:
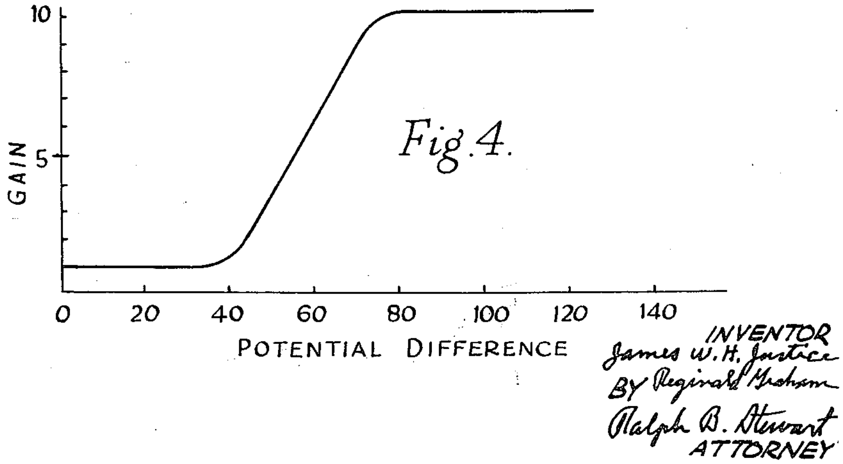
Figure 5:
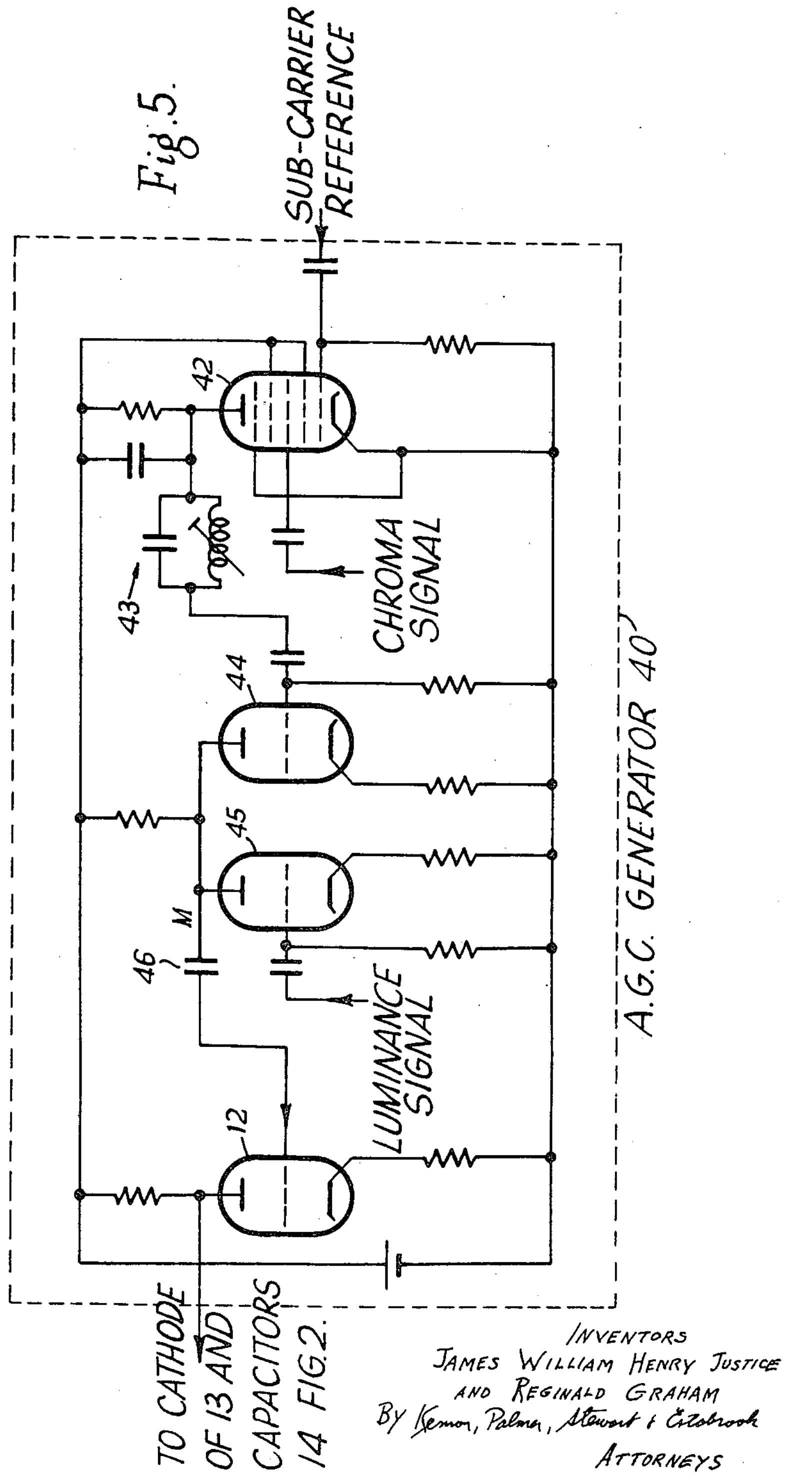
Figure 6:
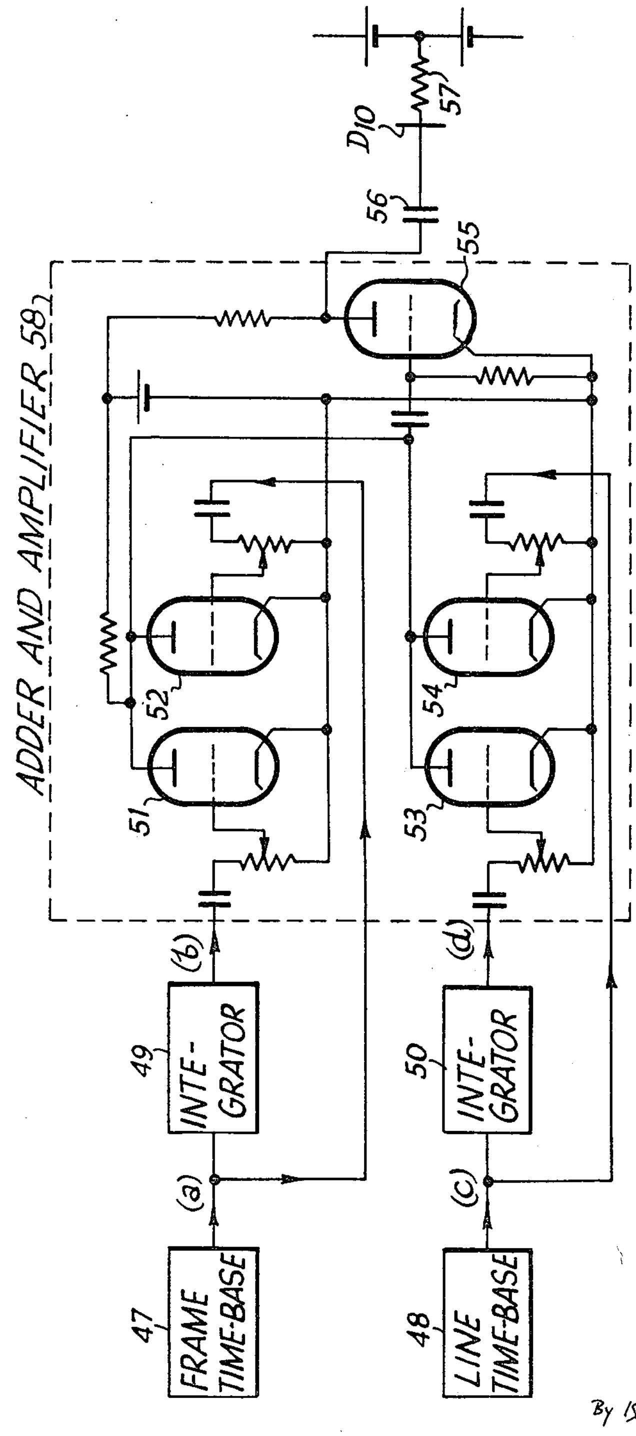
Figure 7:
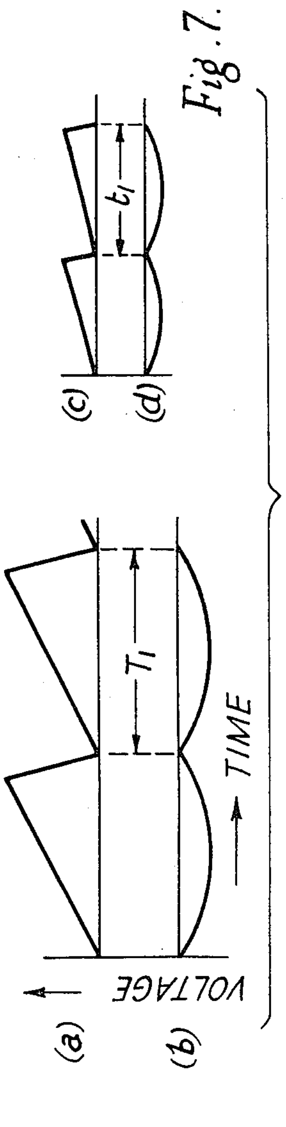

The invention will be described, by way of example, with reference to the accompanying drawing, in which:

FIG. 1 is a block circuit diagram of an embodiment of the invention,

FIG. 2 shows one form that the photo-multiplier and gain control of FIG. 1 may take, FIG. 3 shows an alternative form of photo-multiplier gain control according to the invention, FIG. 4 is a diagram giving an approximate indication of the variation of gain of a photo-multiplier with variation in potential difference between two adjacent dynodes, FIG. 5 is a circuit diagram of a preferred form of automatic gain control generator useful in the circuit of FIG. 1, FIG. 6 is a circuit diagram of a modification of FIG. 2, only a part of the photo-multiplier of FIG. 2 being shown, and FIG. 7 shows wave forms associated with the circuit of FIG. 6.

Referring first to FIG. 1, a cathode ray picture reproducing tube 13 has a screen 31 which may, for example, be constructed in one of the ways described in the above-mentioned co-pending specification. A received luminance signal is applied through an amplifier 32 to an adder 33. A received chroma signal and a received sub-carrier reference signal are applied to chroma circuits 34, the output of which is applied to the adder 33. The output of the adder 33 is applied to the intensity control electrode 35 of the tube 13.

A photo-multiplier 10 is arranged opposite a window 37 in a conductive coating 38 on the inside of the wall of the tube 13 and receives light from the screen 31. The multiplier 10 is arranged to be selectively responsive to light, for instance ultra-violet light, generated when the cathode ray beam scans index stripes on the screen 31. The window 37 may, if desired, be provided with a filter selecting the desired light. Index signals are fed from the photo-multiplier 10 through an amplifier and amplitude limiter 39 to the chroma circuits 34. The chroma and luminance signals are fed to an A.G.C. generator 40 in which they are combined to generate an "M" signal from which is derived a gain control voltage which is applied by lead 41 to the photo-multiplier 10. Further details of the circuit of FIG. 1 are given in the aforementioned co-pending specification.

Referring now to FIG. 2, there is shown a photo-multiplier 10 having a cathode K, which is arranged to receive light through the window 37 of FIG. 1, a number of dynodes $D_1$ to $D_{11}$ and an anode A. A resonant circuit L tuned to the index frequency is connected to the anode A and the index signal is taken at terminal O. The required voltages are supplied by a source 11.

The automatic gain control signal derived from an "M" signal is applied to the grid of a video amplifier 12, the anode of which is connected to the cathode of the cathode ray colour picture reproducing tube 13. Since the dynodes $D_1$ to $D_{11}$ are at different D.C. potentials and since the "M" signal has a D.C. component, considerable circuit complexity might seem to be involved in applying the gain control voltage. However, the required result can be achieved in a simple manner by applying the "M" signal through a coupling which suppresses the D.C. component, and subsequently restoring the D.C. component. This is possible since during the line and frame fly-back intervals the beam current of the cathode ray tube is zero, so that the control signal must during these intervals reach a value which is never exceeded during the line scans.

Referring again to FIG. 2, the anode of the valve 12 is coupled to the dynodes $D_2$, $D_4$, $D_6$ and $D_8$ through capacitors 14 and the D.C. component is restored by means of diodes 15 in parallel with resistors 16.

The effect of the control signal applied to the dynode $D_2$ is to reduce the potential difference between dynodes $D_1$ and $D_2$ and increase the potential difference between the dynodes $D_2$ and $D_3$. If the potential differences between dynodes, in the absence of a gain control signal, are about 80 volts and if the performance of the multiplier is represented by FIG. 4 it is seen that a change in potential difference between dynodes $D_1$ and $D_2$ to say 40 volts will cause a large reduction in gain whereas the change in potential difference between $D_2$ and $D_3$ to 120 volts will cause negligible increase in gain. The net result will, therefore, be a reduction in gain. A like effect is produced at the other controlled dynodes $D_4$, $D_6$ and $D_8$, the overall change in gain being the product of the four individual changes.

By suitably selecting the circuit parameters the law of the gain control can be so matched to the characteristics of the cathode ray tube that an index signal of substantially constant amplitude is obtained at the output terminal 0.

FIG. 5 shows one form that the automatic gain control generator 40 of FIG. 1 may take. The sub-carrier reference and chroma signals are fed to different grids of a synchronous detector 42, the anode of which is coupled through a sub-carrier trap circuit 43 to the grid of a triode 44 which with a triode 45, having the luminance signal applied to its grid, forms an adder. The anodes of the triodes 44 and 45 at which the M signal appears are coupled through a capacitor 46 which eliminates the D.C. component, to the grid of the amplifier 12.

In the circuit of FIG. 3, the gain control voltage is derived from the output of a low-pass filter 17 connected to the last dynode $D_8$, the filter 17 having a cut-off frequency below the frequency of the index signal. The voltage is applied to an amplifier 18 and thence through capacitors 19 to the dynodes $D_2$ and $D_3$. The potential difference across the two load resistors 20 and 21 is applied to the dynode $D_3$ while the potential difference across only the resistor 20, which is about half that across the two resistors, is applied to the dynode $D_2$. The D.C. component is restored, as in FIG. 2, by means of the circuits 15, 16.

The effect of the control signal is to reduce the potential difference between dynodes $D_1$ and $D_2$ and also between dynodes $D_2$ and $D_3$ and to increase the potential differences between dynodes $D_3$ and $D_4$. If the potential differences, in the absence of a gain control signal, are about 80 volts, it can be seen from FIG. 4 that the net results of the control signal can be a change in gain of up to about 100:1.

In order to compensate for differences in light pick-up from different parts of the screen, a control voltage may be generated as shown in FIG. 6. The frame and line time-base waveforms are integrated from generators 47 and 48 at 49 and 50 respectively to produce parabolic waveforms. These waveforms are shown in FIG. 7 in which the waveforms (*a*) and (*b*) relate to the frame time base of period $T_1$ and the waveforms (*c*) and (*d*), which are not to the same scale as (*a*) and (*b*), relate to the line time base of period $t_1$. The time base waveforms are shown at (*a*) and (*c*) and the approximately parabolic waveforms are shown at (*b*) and (*d*). The frame and line time-base waveforms and the two parabolic waveforms derived therefrom are combined in suitable proportions in adders formed by triodes 51, 52 and 53, 54 and the outputs of the adders are combined and fed as a control voltage through an amplifier 55 to the cathode of the cathode ray tube 13 and to the photomultiplier of FIG. 2, only a small part of this photomultiplier being shown in FIG. 6.

This control voltage is an alternating voltage and may be applied through a capacitor 56 to one of the dynodes, say the dynode $D_{10}$ in FIG. 2, a suitable impedance, such as a resistance 57, being connected between the dynode and the voltage source 11. The D.C. voltage on the dynode should be so chosen that the control voltage varies the dynode voltage in the linear voltage/gain range. Thus with a characteristic as shown in FIG. 4, the D.C. voltage may be about 60.

The circuit described will give a first order correction. If a more accurate correction is required, further circuitry is needed.

We claim:

1. In combination with television receiving apparatus of the type in which an indexing signal is generated by a photo-multiplier tube having a plurality of dynodes and positioned to expose its cathode to the screen of the picture tube, means for generating a gain control voltage and means for feeding said voltage to preselected dynodes of said photomultiplier tube for maintaining the amplitude of the indexing signal within predetermined limits.

2. Apparatus according to claim 1 in which the means for deriving the gain control voltage includes a filter circuit connected to an output portion of said photomultiplier.

3. Apparatus according to claim 2 in which said filter is connected to one of the dynodes of said photomultiplier.

4. Apparatus according to claim 1 in which the means for generating the gain control voltage comprises circuit means for combining and adding the chroma and luminance signals.

5. Apparatus according to claim 1 in which the gain control voltage includes a D.C. component and the means for feeding the gain control voltage to the photomultiplier includes a capacitor and means for restoring the D.C. component which is suppressed by the said capacitor.

References Cited in the file of this patent

UNITED STATES PATENTS

| | | |
|---|---|---|
| 2,564,572 | Haynes | Aug. 14, 1951 |
| 2,837,687 | Thompson et al. | June 3, 1958 |
| 2,897,398 | Goodman | July 28, 1959 |